US004001646B2

United States Statutory Invention Registration [19]

[11] Reg. Number: H1646

Kato et al.

[45] Published: May 6, 1997

[54] SPEECH RECOGNITION ADAPTER FOR TELEPHONE SYSTEM

[76] Inventors: Yasuhiko Kato; Masao Watari; Miyuki Tanaka, all of Sony Corporation 7-35, Kitashinagawa 6-Chome, Shinagawa-Ku, Tokyo, Japan

[21] Appl. No.: 59,035

[22] Filed: May 7, 1993

[30] Foreign Application Priority Data

May 8, 1992 [JP] Japan ..... 4-143429

[51] Int. Cl.[6] ..... H04M 1/26

[52] U.S. Cl. ..... 379/355; 379/389; 395/2.84

[58] Field of Search ..... 395/2.79, 2.84; 379/80, 67

[56] References Cited

U.S. PATENT DOCUMENTS

| | | | |
|---|---|---|---|
| 4,837,808 | 6/1989 | Immendorffer et al. | 379/96 |
| 4,850,005 | 7/1989 | Hashimoto | 379/51 |
| 4,883,713 | 11/1989 | Muroi et al. | 381/43 |
| 5,111,501 | 5/1992 | Shimanuki . | |
| 5,125,024 | 6/1992 | Gokeen et al. | 379/88 |
| 5,220,595 | 6/1993 | Uehara | 379/74 |
| 5,222,121 | 6/1993 | Shimada | 379/88 |

FOREIGN PATENT DOCUMENTS

| | | |
|---|---|---|
| 0168039 | 7/1985 | European Pat. Off. . |
| 0194387 | 9/1986 | European Pat. Off. . |
| 3837385 | 5/1989 | Germany . |
| 2188812 | 10/1987 | United Kingdom . |

OTHER PUBLICATIONS

Electrical Communication vol. 59, No. 3, 1985, Harlow GB, pp. 281–285 Immendorfer "Voice Dialer".

*Primary Examiner*—Bernarr E. Gregory

[57] ABSTRACT

A voice responsive telephone adapter, or speech recognition adapter, for use with a telephone set having for example, telephone answering capabilities. The voice responsive telephone adapter may be used to dial telephone numbers or control auxiliary functional capabilities relating the message playback, for example in response to recognized verbal commands, such as, for example, names or operational functions.

16 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SPEECH RECOGNITION ADAPTER FOR TELEPHONE SYSTEM

BACKGROUND OF THE INVENTION

1. Field of the Invention

The present invention relates to a speech recognition adapter for use with one such as a telephone set with a telephone answering function or capabilities.

2. Description of the Related Art

Conventional telephone sets with a telephone answering function generally record messages from incoming calls that arrive while a called party is out or otherwise unavailable to answer the telephone, on magnetic tape or on some type of electronic memory device. A called party can call his or her own telephone set from a remote telephone set, such as a telephone set outside his or her home, and press pushbuttons of the keypad of the remote telephone set to transmit a signal representing a pre-registered password as well as a predetermined signal to reproduce and listen to any recorded incoming call messages that may have been recorded on the tape or memory.

A telephone set having a telephone answering function can be remotely controlled via commands dialed or keyed in through a remote telephone keypad, or dial, to perform various functions, e.g., reproduce and erase recorded messages.

Conventional telephone sets with telephone answering functions are generally, however, not so simple to use because the pushbuttons of a remote telephone set must generally be pressed in various different sequential combinations to perform the respective various functions, e.g., to reproduce and erase recorded messages, and such different pushbutton combinations must generally be memorized by a user.

To place a telephone call from a telephone set with a telephone answering function, pushbuttons thereof are generally depressed to dial a desired telephone number of a person to whom the telephone call is to be made. Since different telephone numbers are used to call different persons, those different telephone numbers generally also have to be memorized by a user.

There also exists a voice activated telephone set having a memory, for example, which stores the names of persons and their telephone numbers. When a user verbally pronounces or utters the name of a person to be called, the telephone set transmits a pulse or dial tone signal corresponding to the stored telephone number that is associated with the uttered name. Wide spread use of this type of telephone set, however, is currently impractical due to the relatively high cost.

SUMMARY OF THE INVENTION

It is therefore an object of the present invention to provide a speech recognition adapter for use in a telephone system, which is of low cost and allows a telephone set to be operated with ease.

According to the present invention, there is provided a speech recognition adapter for use in a telephone system having a telephone set and an exchange office or central switching office, adapted to be connected between a modular jack coupled to the telephone set and a modular jack coupled to the exchange office, the speech recognition adapter incorporates a speech recognizing unit for recognizing a voice sound, or voice sound pattern, a storage control unit for storing a voice sound recognized by the speech recognizing unit in association with particular command information such as, for example, telephone numbers, names or telephone set operational functions and a transmitting unit for transmitting or dialing a telephone number or issuing a signal representing telephone set operational functions in response to a recognized voice sound pattern.

The speech recognizing unit recognizes or detects a voice sound representing the name of a person to be called via the telephone set. If the detected voice sound corresponds to a name stored in the storage control unit, the transmitting unit transmits or dials the telephone number associated with the name stored in memory to which the detected voice sound corresponds.

The speech recognizing unit may alternatively recognize a voice sound transmitted from the exchange office representing or corresponding to a function of the auxiliary answer machine of the telephone set. The speech recognizing adapter may be responsive to the voice sound transmitted from the exchange office and recognized by the speech recognizing unit for transmitting a message or performing an operation associated with a command stored in the storage control means which corresponds to a detected voice sound.

The speech recognition adapter is connected between the modular jack coupled to the telephone set and the modular jack coupled to the exchange office. The speech recognition adapter recognizes a voice sound corresponding to or the name of a person to be called or a function of the telephone set. The voice sound is stored in memory in association with a telephone number transmitted from the telephone set. Then, in response to a voice sound representing the name of a person to be called or a function of the telephone set, the speech recognition adapter transmits or dials a telephone number. Simply by being connected to the existing telephone set, the speech recognition adapter can dial a telephone number or operate the telephone set under the control of a voice sound. The speech recognition adapter can thus operate the telephone set with ease at low cost.

In one mode, the speech recognizing unit recognizes a voice sound transmitted from the telephone set, which represents the name of a person to be called, and the transmitting unit transmits or dials a telephone number representing the name of a person to be called which is stored in the storage control means to the exchange office in response to the voice sound from the telephone set and recognized by the speech recognizing unit. In this mode, the telephone set can be operated with ease because the user can make a telephone call simply by pronouncing or uttering the name of the person to be called.

In another mode, the speech recognizing unit recognizes a voice sound from the exchange office, which represents a function of the telephone set. The transmitting means transmits a telephone number stored in the storage control unit to the telephone set in response to the voice sound representing the function of the telephone set from the exchange office and recognized by the speech recognizing means. In this mode, the user is not required to memorize how to operate the telephone set, and the telephone set can be operated with ease because the user can control the telephone set simply by pronouncing or uttering the desired function of the telephone set.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
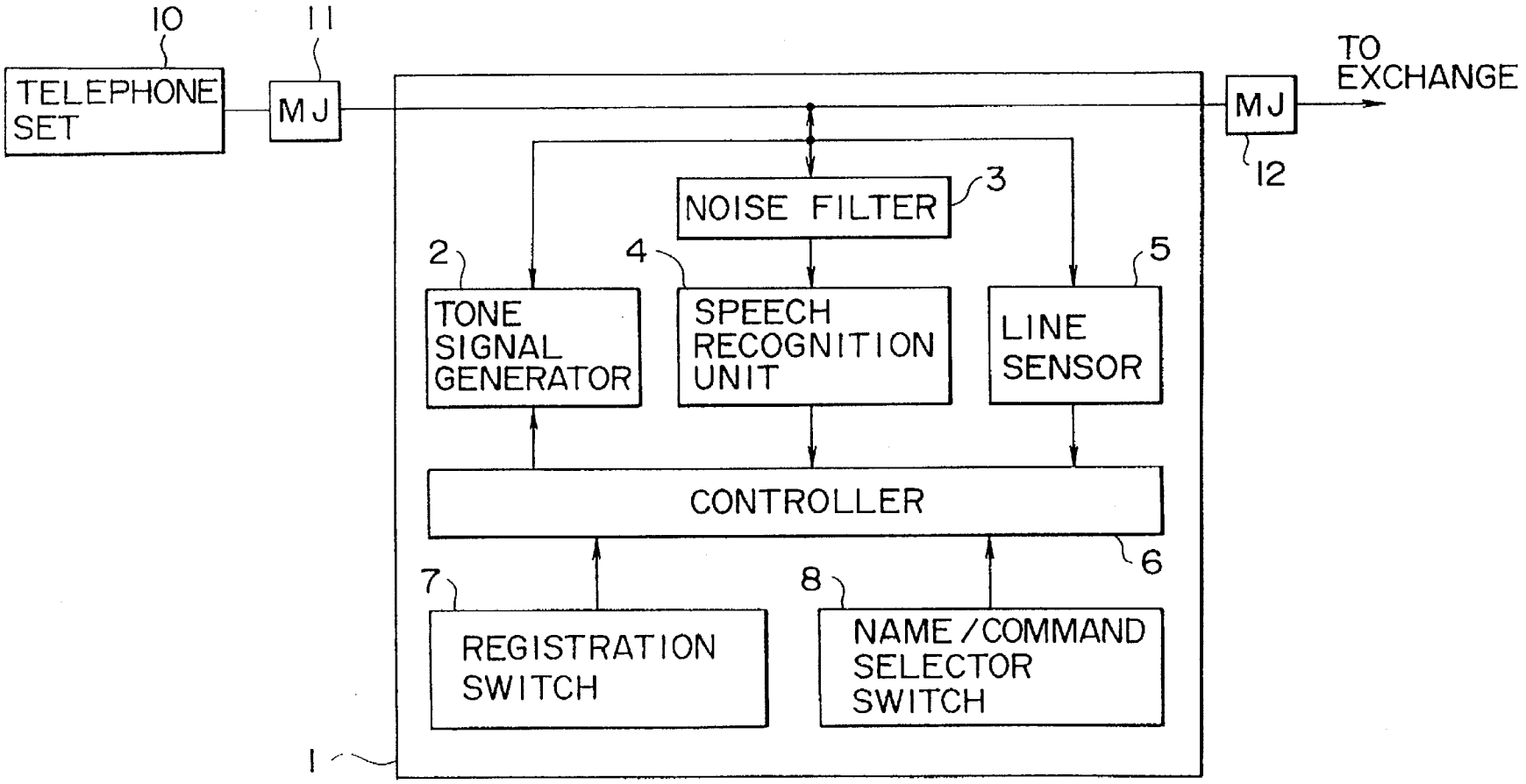
FIG. 1 is a block diagram of a speech recognition adapter according to the present invention which is directly connected to modular jacks on telephone set and exchange office sides.

As shown in FIG. 1, a speech recognition adapter, generally designated by the reference numeral 1, according to the present invention is connected between a telephone set 10 and an exchange office. The telephone set 10 has a telephone answering function, and is of a known nature capable of performing various functions, e.g., reproducing and erasing messages that have been recorded on a built-in tape or electronic memory device (not shown) while the user is away, under the control of dial numbers transmitted from a remote telephone set (not shown).

The speech recognition adapter 1 incorporates a tone signal generator 2, a noise filter 3, a speech recognition unit 4, a line sensor 5, a controller 6, a registration switch 7, and a name/command selector switch 8. The speech recognition adapter 1 is connected to a modular jack 11 which is coupled to the telephone set 10 and a modular jack 12 which is coupled to the exchange office. The tone signal generator 2 is controlled by the controller 6 to transmit a pushbutton or touchtone signal or a dial pulse signal corresponding to a dialed number to the telephone set 10 or the exchange office.

The noise filter 3 serves to remove noise that may be present on the telephone transmission line and also a dial tone transmitted from the exchange office (switchboard, not shown) when the handset (not shown) of the telephone set 10 is off-hook. The speech recognition unit 4 recognizes or detects, through the noise filter 3, a speech or voice signal transmitted from the telephone set 10 or the exchange office, and supplies a recognized result output signal to the controller 6. The line sensor 5 monitors the condition of the telephone transmission line for a change in the line voltage, for example, it detects whether the handset of the telephone set 10 is off-hook to make a telephone call from the telephone set 10 or to answer a telephone call from the exchange office, and outputs a recognized result output signal to the controller 6. The line sensor 5 also detects which keys have been activated or dialed from the telephone set 10 or the exchange office, to the telephone transmission line. The information or commands represented by the activated keys is output from line sensor 5 to controller 6.

When registration switch 7 is turned on, i.e., when the speech recognition adapter 1 is in a registration mode, the controller 6 associates an uttered voice sound, which has been outputted from the telephone set 10 and recognized by the speech recognition unit 4, indicative of the name of a person to be called or desired function of the telephone set 10, with a dial number entered into memory by keys of actuating the keypad or dial (not shown) of telephone set 10. The dialed number or command is stored in memory in association with the appropriate voice or verbal sound pattern information (not shown).

When the registration switch 7 is turned off, i.e., when the speech recognition adapter 1 is in a speech recognition mode, the controller 6 reads, from the built-in memory, a dial number associated with a pronounced uttered voice sound indicative of the name of a person to be called or a function of the telephone set 10. A voice sound is outputted from the telephone set 10 or the exchange office and recognized or detected by the speech recognition unit 4. A control signal is sent to tone signal generator 2 to transmit the dial number to the telephone set 10 or the exchange office.

The registration switch 7 serves to switch the operation mode of the speech recognition adapter 1 between a registration mode and a speech recognition mode. The name/command selector switch 8 is effective or active when the registration switch 7 is turned on. The name/command selector switch 8 is shifted to select a name mode when a dial number to be stored in the built-in memory of the controller 6 is a telephone number associated with the name of a person to be called. The name/command selector switch 8 is shifted to select a command mode when a dial number to be stored in the built-in memory of the controller 6 is a command associated with a function of the telephone set 10.

Operation of the speech recognition adapter 1 will be described below. It is assumed that the registration switch 7 is turned on and the name/command selector switch 8 is shifted to select the name mode, i.e., the speech recognition adapter 1 is in a name registration mode. When the handset of the telephone set 10 is lifted off-hook and the name of a person to be registered is pronounced or uttered twice, the line sensor 5 detects the off-hook of the handset, and indicates the off-hook condition to the controller 6. The controller 6 then applies a control signal to the speech recognition unit 4 to register the voice sound (indicating the name of the person) that is supplied from the telephone set 10 (handset of the telephone set 10) through the modular jack 11 and the noise filter 3.

Upon detection of the control signal from the controller 6, the speech recognition unit 4 registers the voice sound (indicating the name of the person) that is supplied from the telephone set 10 (handset of the telephone set 10) through the modular jack 11 and the noise filter 3, as a standard pattern in a built-in standard pattern memory.

The speech recognition unit 4 uses one of the two uttered names of a person, which has been uttered twice while the handset of the telephone unit 10 is lifted off-hook, for registration, and the other utterance for confirmation. Specifically, only when the voice sound patterns of the two utterances of the name agree with each other, will the speech recognition unit 4 store either one of the utterances of the name in the built-in standard pattern memory.

Immediately thereafter, when pushbuttons of the keypad of telephone set 10 are pressed to input the telephone number of the person whose name has been uttered and the handset of the telephone set 10 is placed on-hook, the telephone number entered is supplied through the line sensor 5 to the controller 6. The telephone number is associated with the registered name stored in the built-in standard pattern memory of the speech recognition unit 4, and stored in the built-in memory of the controller 6.

If there are a plurality of persons whose names have to be registered, the above process is repeated.

It is assumed that the registration switch 7 is turned on and the name/command selector switch 8 is shifted to select the command mode, i.e., the speech recognition adapter 1 is in a command (function of the telephone set 10) registration mode. In the command registration mode, a password number is first registered. Specifically, the handset of the telephone set 10 is lifted off-hook and a multi-digit dial number, for example, a four-digit dial number, is input as a password number via pushbuttons of the keypad of the telephone set 10, and then the handset of the telephone set 10 is placed on-hook. The password number is supplied through the line sensor 5 to the controller 6, and stored in the built-in memory of the controller 6.

Then, the handset of the telephone set 10 is lifted off-hook, and a voice sound representing a command for executing a function of the telephone set 10, for example, a voice sound of "PLAYBACK" representing a command to play back messages that have been recorded on the tape, is uttered twice by a party. The line sensor 5 detects the on-hook of the handset, and indicates the on-hook condition to the controller 6. The controller 6 then applies a control signal to the speech recognition unit 4 to register the voice sound (indicating the command "PLAYBACK") that is supplied from the telephone set 10 (handset of the telephone set 10) through the modular jack 11 and the noise filter 3.

Upon detection of the control signal from the controller 6, the speech recognition unit 4 registers the voice sound (indicating the command "PLAYBACK") that is supplied from the telephone set 10 (handset of the telephone set 10) through the modular jack 11 and the noise filter 3, as a standard pattern in a built-in standard pattern memory.

As in the name registration mode, the speech recognition unit 4 uses one of the two utterances of the name of the person, which has been uttered while the handset of the telephone unit 10 is lifted off-hook, for registration, and the other utterance is used for confirmation.

Immediately thereafter, when pushbuttons of the keypad of telephone set 10 are activated to input a dial number for performing the function of the telephone set 10 which corresponds to the previously uttered command "PLAYBACK", i.e., a dial number (e.g., "#1") for playing back messages that have been recorded on the tape, and the handset of the telephone set 10 is placed on-hook, the dial number is supplied through the line sensor 5 to the controller 6. The dial number is associated with the registered voice sound (command "PLAYBACK") stored in the standard pattern memory of the speech recognition unit 4, and stored in the built-in memory of the controller 6.

If there are a plurality of commands (functions of the telephone set 10) which have to be registered, the above process except the registration of the password number is repeated.

It is assumed that the registration switch 7 is turned off, i.e., the speech recognition adapter 1 is in a speech recognition mode. When the handset of the telephone set 10 is lifted off-hook in order to transmit a signal from the telephone set 10 (i.e., to make a telephone call from the telephone set 10, the line sensor 5 detects the off-hook of the handset of the telephone set 10, and indicates the off-hook condition to the controller 6. The controller 6 then applies a control signal to the speech recognition unit 4 to recognize a voice sound (representing the name of a person to be called) output or transmitted from the telephone set 10. Upon detection of the control signal from the controller 6, the speech recognition unit 4 starts sampling or recognizing the voice sound which represents the name of a person to be called.

Immediately thereafter, when pushbuttons of the keypad of telephone set 10 are pressed to transmit dial numbers indicative of a telephone number, the line sensor 5 detects the dial numbers forwards information represented by the detected dial numbers to the controller 6. The controller 6 outputs a control signal to the speech recognition unit 4 to cause the speech recognition unit 4 to stop the speech recognition process. Specifically, when pushbuttons of the keypad of telephone set 10 are pressed to transmit dial numbers indicative of a telephone number, the speech recognition adapter 1 establishes a through connection allowing a signal from the modular jack 11 to be outputted to the modular jack 12 and also allowing a signal from the modular jack 12 to be outputted to the modular jack 11.

If no pushbuttons of the keypad of telephone unit 10 are activated and the name of a person to be called is uttered, then the uttered voice sound (representing the name of the person) is supplied from the telephone set 10 through the modular jack 11 and the noise filter 3 to the speech recognition unit 4. The speech recognition unit 4 refers to the standard patterns stored in the built-in standard pattern memory. If the uttered voice sound corresponds to a voice sound pattern stored in the standard pattern memory, a signal is sent to the controller 6. The controller 6 then reads dial numbers (representing the telephone number) which are associated with the name of the person from the speech recognition unit 4 from the built-in memory, and supplies the dial numbers to the tone signal generator 2. The tone signal generator 2 supplies a touch-tone or dial pulse signal corresponding to the dial numbers (representing the telephone number) supplied from the controller 6, through the modular jack 12 to the exchange office to dial the telephone number associated with the name of the person whose name was pronounced or uttered.

As described above, the user can make a telephone call to a person simply by uttering the name of the person.

If a call arrives from another telephone set while the telephone set 10 is in a telephone answering mode, a message of the telephone answering mode, for example, "I AM OUT NOW. PLEASE LEAVE A MESSAGE.", is transmitted from the telephone set 10. If any dial numbers indicating a password number are not immediately thereafter transmitted from the calling party's telephone set, the speech recognition adapter 1 sets up a through connection, and the telephone set 10 operates in the telephone answering mode.

If dial numbers indicating a password number are transmitted from the calling party's telephone set after the outgoing message of the telephone answering mode has been transmitted from the telephone set 10, then the line sensor 5 detects the password number and supplies it to the controller 6. The controller 6 determines whether or not the password number from the line sensor 5 agrees or is identical to a password number that has been registered in a memory. If the password number detected by the line sensor 5 agrees with a password number that has been registered in memory, then the controller 6 outputs a control signal to the speech recognition unit 4 to recognize a voice sound (representing a command) transmitted from a calling party's telephone set. Upon detection of the control signal from the controller 6, the speech recognition unit 4 is activated to receive the voice sound representing the command.

If pushbuttons of the keypad of the calling party's telephone set are thereafter pressed to transmit dial numbers indicative of a command, the dial numbers are detected by the line sensor 5, which outputs a signal indicating the reception of a command from a calling party's telephone set, to the controller 6. The controller 6 outputs a control signal to the speech recognition unit 4 to cause the speech recognition unit 4 to stop the speech recognition process. Where no dial numbers indicative of a command are transmitted from a calling party's telephone set, the speech recognition adapter 1 establishes a through connection between telephone set 10 and the telephone exchange (i.e. calling party).

If no pushbuttons of the keypad of a calling party's telephone set are pressed and a command "PLAYBACK", for example, is uttered by a calling party via their telephone set, then the voice sound indicating the command "PLAYBACK" is supplied from the calling party's telephone set through the modular jack 12 and the noise filter 3 to the speech recognition unit 4. The speech recognition unit 4 scans the standard patterns stored in the standard pattern memory. If the voice sound command corresponds to a standard pattern stored in memory, the command associated with the standard pattern is output by speech recognition unit 4 to controller 6 (i.e. "PLAYBACK"). The controller 6 then reads a dial number, for example, "#1", which is associated with the command "PLAYBACK" from memory, and supplies the dial number to tone signal generator 2. Tone signal generator 2 supplies a touchtone or a dial pulse signal corresponding to the dial number "#1" through the modular jack 11 to the telephone set 10. The telephone set 10 now performs the function corresponding to or associated with the dial number "#1", for example, playback of messages that have been recorded on the tape or electronic or optical memory.

As described above, a user can control functions of the telephone set 10 (i.e., operate the telephone set 10) simply by uttering or verbally pronouncing a command from a remote telephone set.

Operation of the speech recognition adapter 1 in the name registration mode (for registering the name of a person to be called), the command registration mode (for registering a function of the telephone set 10), the speech recognition mode will be described below with reference to the flowcharts of FIGS. 2, 3, and 4.

Figure 2:
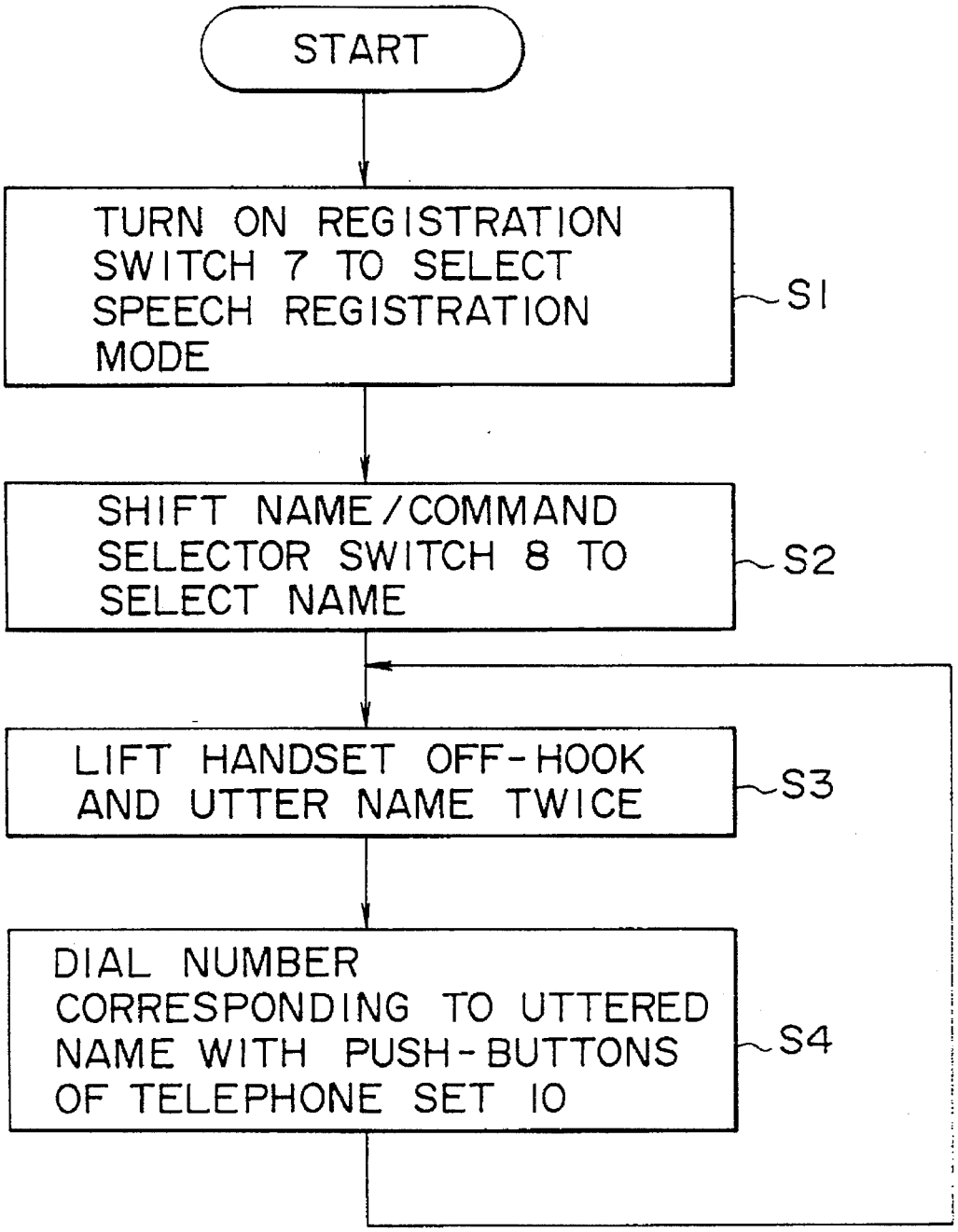
FIG. 2 is a flowchart of an operation sequence of the speech recognition adapter shown in FIG. 1 when it operates in a name registration mode.

In FIG. 2, the registration switch 7 is turned on in step S1, the name/command selector switch 8 is shifted to select name in step S2. The speech recognition adapter 1 enters the name registration mode (for registering the name of a person to be called) in the steps S1, S2.

In step S3, the handset of the telephone set 10 is lifted off-hook, and the name of a person to be called is uttered or verbally pronounced twice by the user. Voice pattern information representing the verbalized name is stored in the standard pattern memory of the speech recognition unit 4. In a step S4, the telephone number of the person whose name has been uttered or verbally pronounced in step S3 is input, associated with the name of the person, and stored in the memory of the controller 6. The name registration mode is now completed.

If there is a plurality of persons whose names have to be registered, the above steps S3 and S4 are repeated. With each name registration, one of the two utterances of the name of the person which has been uttered twice in step S3, is used for registration while the other utterance is used for confirmation.

Figure 3:
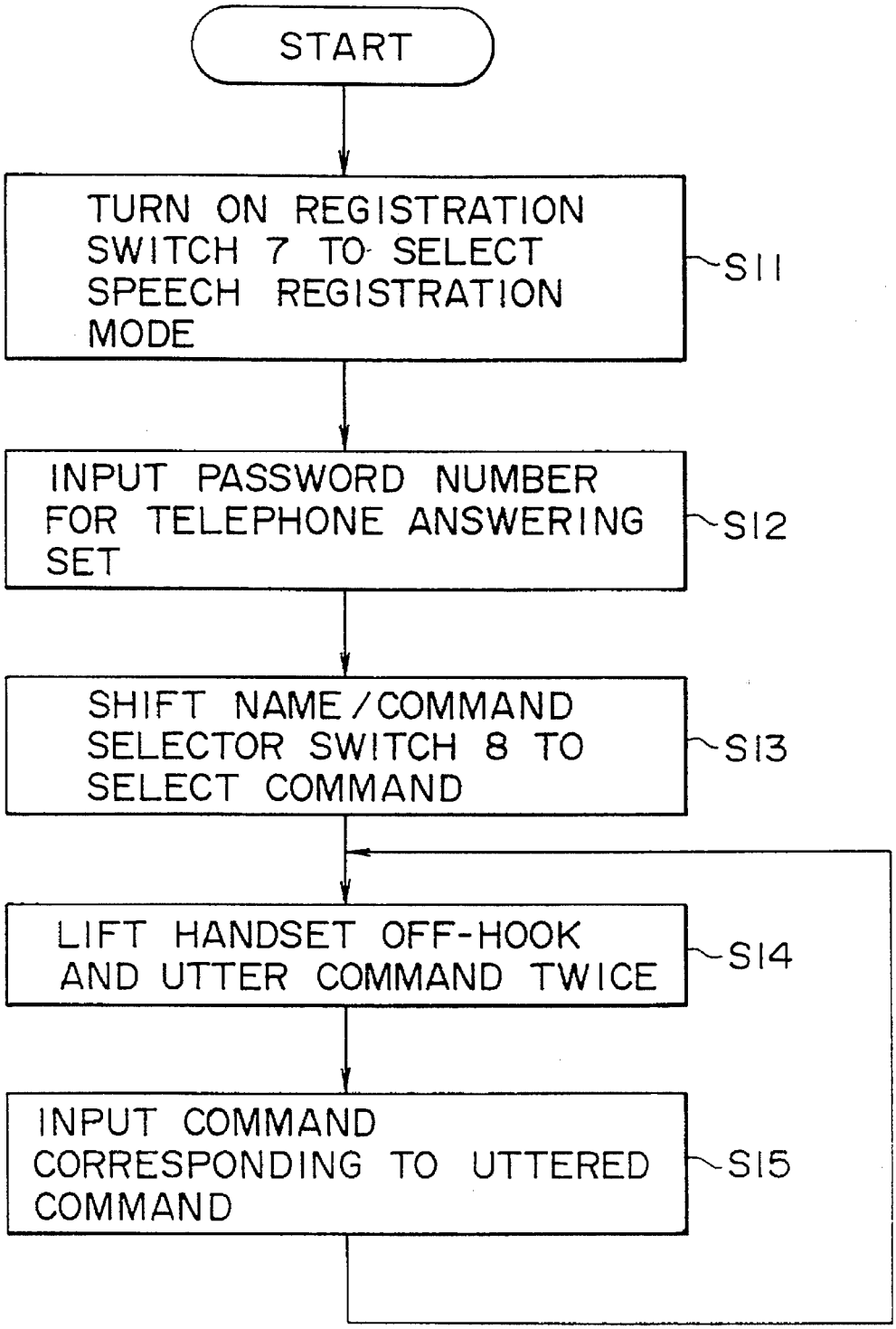
FIG. 3 is a flowchart of an operation sequence of the speech recognition adapter shown in FIG. 1 when it operates in a command registration mode.

In FIG. 3, the registration switch 7 is turned on in step S11, then a password number is input in step S12, and the name/command selector switch 8 is shifted to select command in step S13. The speech recognition adapter 1 enters the command registration mode (for registering a function of the telephone set 10) in the steps S11,S12, S13.

In step S14 the handset of the telephone set 10 is lifted off-hook, and a verbal command is uttered twice by a user and stored in standard pattern memory of the speech recognition unit 4. In step S15, a dial number corresponding to the command which has been uttered in step S14 is input, associated with the command, and stored in memory of the controller 6. The command registration mode is now complete.

If there is a plurality of persons whose names have to be registered, the above steps S3 and S4 are repeated. With each name registration, one of the two utterances of the name of the person which has been uttered twice in step S3, is used for registration, and the other utterance is used for confirmation.

Figures 4, 4A:
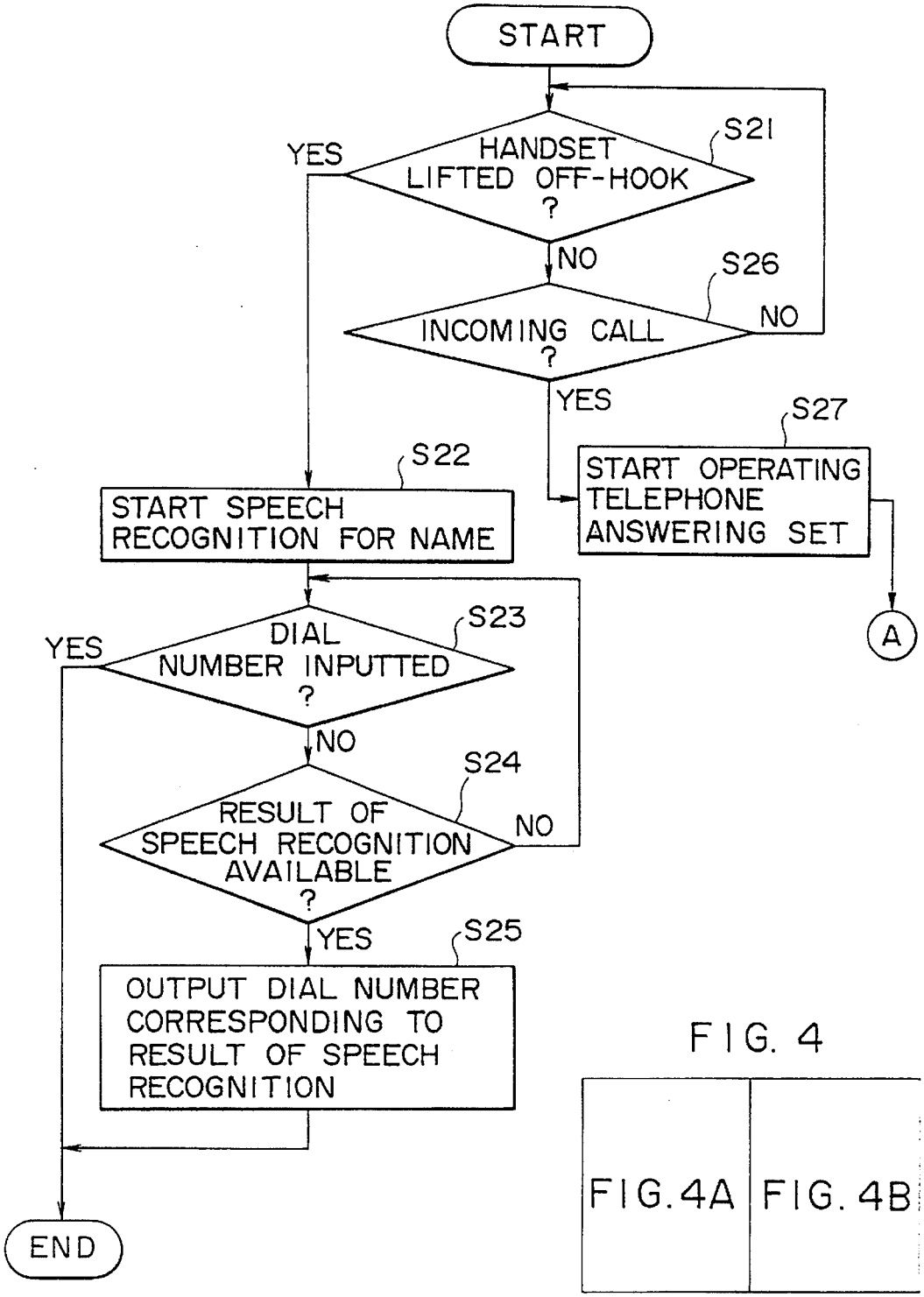
FIG. 4 is an illustration showing the relation of FIG. 4A and 4B to each other.
FIG. 4A and FIG. 4B are a flowchart of an operation sequence of the speech recognition adapter shown in FIG. 1 when it operates in a speech registration mode.
Figure 4B:
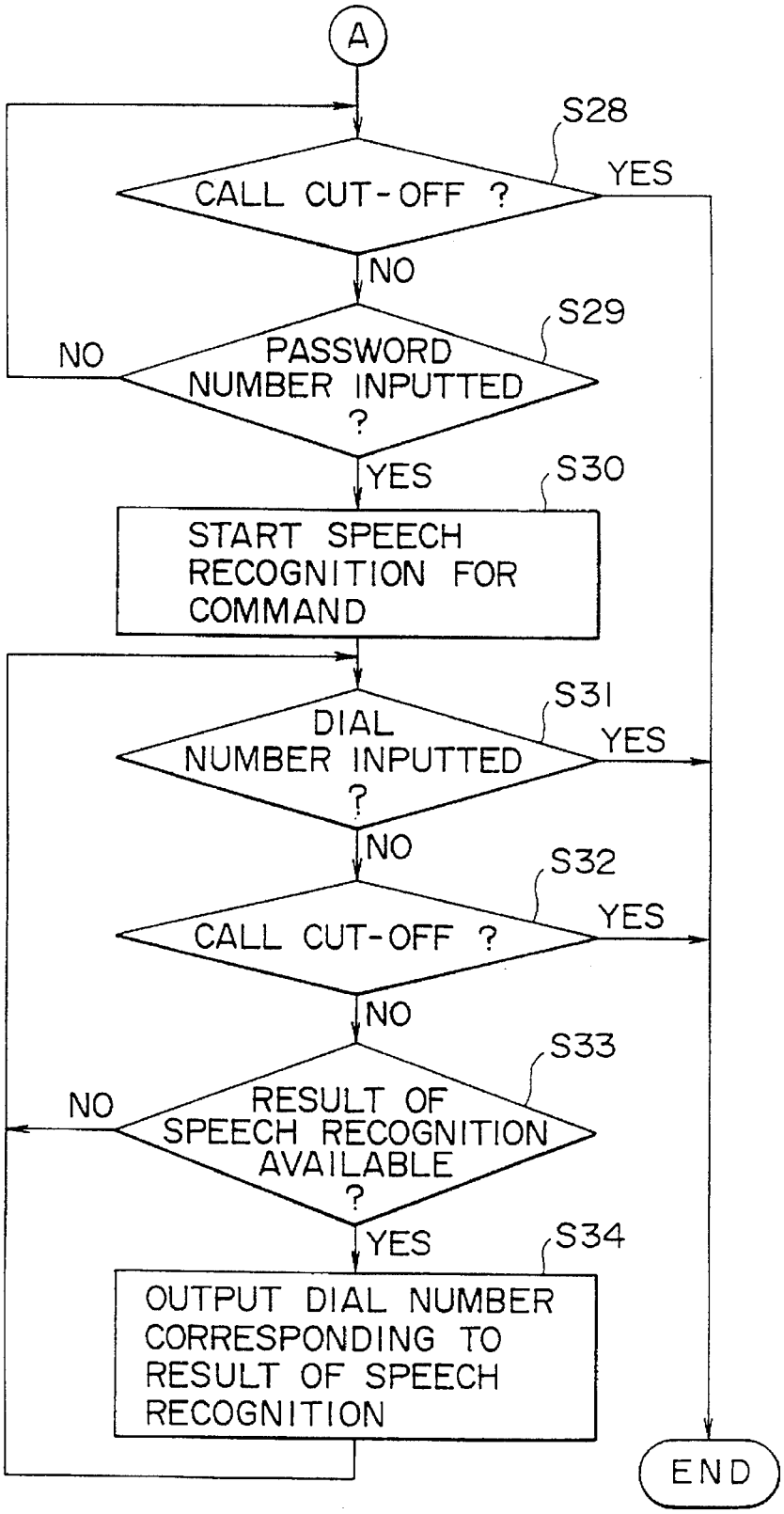

FIG. 4A and FIG. 4B show the speech recognition mode of the speech recognition adapter 1. In FIG. 4A, step S21 determines whether the handset of the telephone set 10 is lifted off-hook or not. If the handset of the telephone set 10 is lifted off-hook, then the process proceeds to step S22 to start a speech recognition process for recognizing the name of a person to be called. Step S23 determines whether pushbuttons of the keypad of telephone set 10 are pressed or activated to input dial numbers (representing a telephone number). If dial numbers (representing a telephone number) are input, the speech recognition process is brought to an end because a signal is transmitted using the pushbuttons of the telephone set 10.

If dial numbers (representing a telephone number) are not input in step S23, then control proceeds to step S24 which determine whether a recognized voice signal is input or received. If no recognized voice signal is received during the speech recognition process started in the step S22, then control goes back to step S23. The steps S23, S24 are repeated until a recognized voice signal is produced or received during the speech recognition process started in the step S22.

If a recognized voice signal is produced or received during the speech recognition process started in the step S22, i.e., if a recognized name of a person to be called is uttered in step S24 after the handset is lifted off-hook in step S21, control goes to step S25 in which dial numbers (representing telephone number) associated with the recognized name of step S24 are transmitted from the telephone set 10. Thereafter, the speech recognition process is complete.

If the handset of the telephone set 10 is not lifted off-hook in the step S21, then control proceeds to step S26 to determine whether a telephone call from another telephone set is received by the telephone set 10. If not, then control returns to step S21. Steps S21, S26 are repeated until a telephone call from a remote telephone set is received by telephone set 10.

If a telephone call from a remote telephone set is received by the telephone set 10 in the step S26, control proceeds to step S27 which starts the telephone answering mode of telephone set 10. In step S28, it is determined whether the telephone call received from a remote telephone, or calling party, is cut off or not. If cut off, the speech recognition mode comes to an end. If not, control goes to step S29 .which determines whether a password number is transmitted, or dialed, from the remote telephone set. If a password number is not transmitted or dialed, in step S29, control returns to step S28. Steps S28, S29 are repeated until a password number is transmitted or dialed, from the other telephone set.

If a password number is transmitted from the other telephone set in step S29, then control proceeds to step S30 which starts a speech recognition process for recognizing a command. Then, control goes to step S31 to determine whether pushbuttons of the remote telephone set from which the telephone call has been initiated, are pressed or actuated to transmit or dial a dial number. If a dial number is transmitted from the remote telephone set in step S31, the speech recognition mode is ended since a command has been transmitted via the pushbuttons of the keypad of the remote telephone set.

If no dial number is transmitted from the remote telephone set in step S31, then control proceeds to step S32 which determines whether the telephone call from the remote telephone set is cut off or not. If cut off, the speech recognition mode comes to an end. If not cut off, control goes to step S33 which determines whether a recognized voice signal is received in step S30. If no recognized voice signal is received during the speech recognition process started in step S30, control goes back to step S31. Steps S31, S32, S33 are repeated until a recognized voice signal is received during the speech recognition process started in step S30.

If a recognized voice signal is received during the speech recognition process started in step S30, control goes to step S34 in which a dial number, associated with the command whose voice sound or signal has been received in step S33, is transmitted to telephone set 10. Thereafter, the speech recognition process is complete.

After the speech recognition process is complete, it is started again from step S21 by a timer-initiated interrupt signal.

As described above, the telephone set 10 can be controlled (operated) by voice sounds or signals, simply by connecting the speech recognition adapter 1 between the modular jack 11 coupled to the telephone set 10 and the modular jack 12 coupled to the exchange office. The telephone set 10 can be operated with ease and at low cost.

Figure 5:
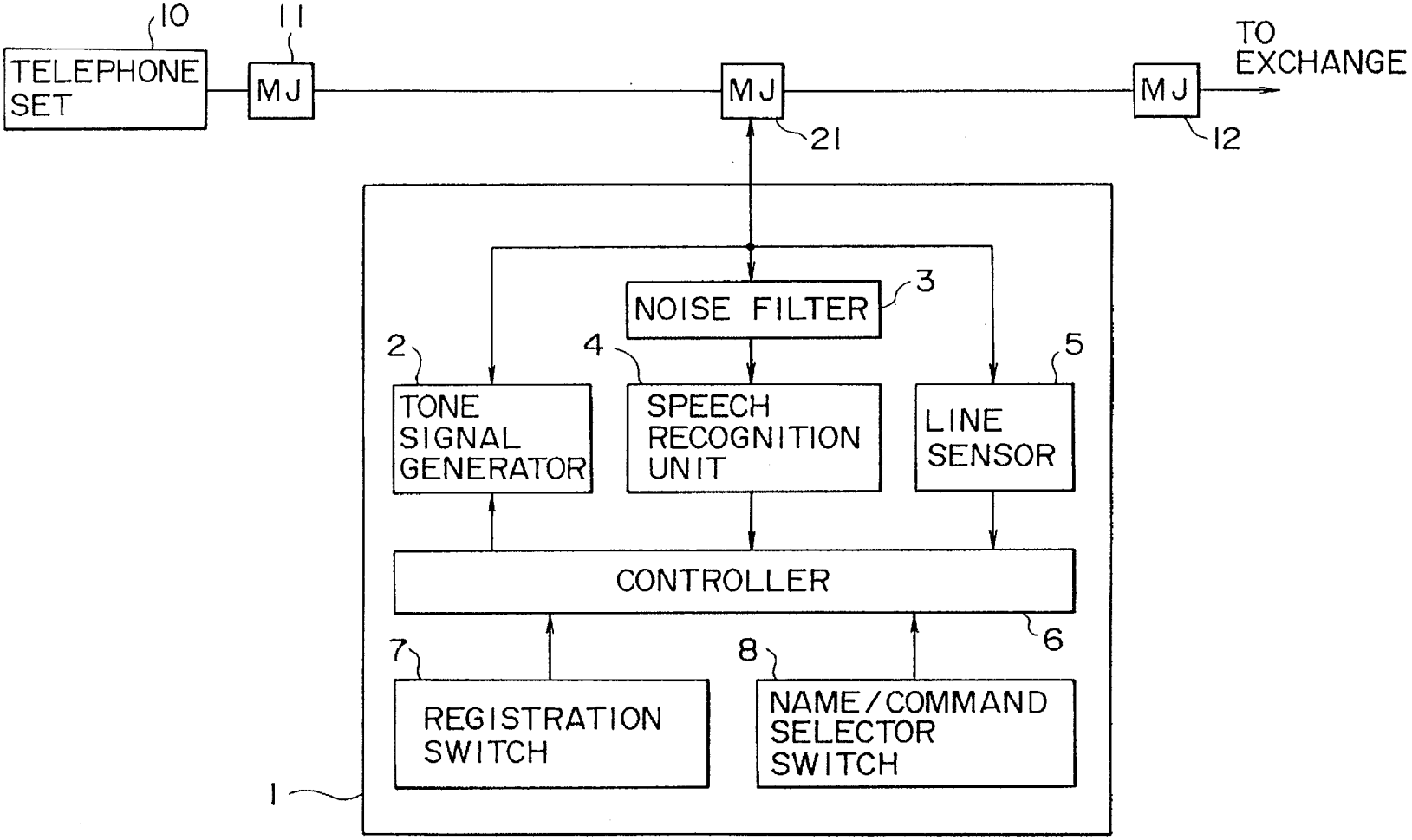
FIG. 5 is a block diagram of the speech recognition adapter that is connected to modular jacks on telephone set and exchange office sides through a three-way modular jack.

In the above embodiment, the speech recognition adapter 1 is connected in series between the modular jack 11 coupled to the telephone set 10 and the modular jack 12 coupled to the exchange office. However, as shown in FIG. 5, the modular jack 11 coupled to the telephone set 10, the modular jack 12 coupled to the exchange office, and the speech recognition adapter 1 may be connected by a three-way modular jack 21.

Although the foregoing description relates to embodiment of the present invention, it will be understood by those skilled in the art that various changes and modifications may be made therein without departing from the scope and spirit of the claimed invention.

What is claimed is:

1. A speech recognition adapter for use in a telephone system having a telephone set, said speech recognition adapter comprising:

speech recognizing means including a first memory for performing a voice recognition process on a voice sound received from the telephone set, said voice sound including the name of a person to be called, and for storing said voice sound as a voice sound pattern in said first memory;

storage control means including a second memory and a controller for controlling said speech recognizing means to store said voice sound pattern in said first memory in response to receiving repeated utterances of said voice sound only when said voice sound patterns of said repeated utterances of said voice sound agree with each other, said storage control means storing said voice sound in said second memory in association with at least one of a plurality of telephone numbers transmitted from the telephone set and, means for entering said at least one of a plurality of telephone numbers.

2. A speech recognition adapter according to claim 1, wherein said storage control means is capable of selecting a registration mode, said controller being operable to store the voice sound pattern of said voice sound recognized by said speech recognizing means and the telephone number associated with said voice sound pattern in said second memory in said registration mode.

3. A speech recognition adapter according to claim 2 wherein said storage control means is capable of selecting a speech recognition mode, said controller being operable to output the telephone number and said associated voice sound pattern from said second memory in response to said voice sound recognized by said speech recognizing means in said registration mode.

4. A speech recognition adapter according to claim 1, wherein said storage control means is capable of selecting a name registration mode, and said control is operable to store the voice sound pattern of said voice sound recognized by said speech recognizing means as name information in said first memory in said name registration mode.

5. A speech recognition adapter according to claim 1, wherein said storage control means is capable of selecting a command registration mode, said controller being operable to store the voice sound pattern of said voice sound recognized by said speech recognizing means as command information in said first memory in said command registration mode.

6. A speech recognition adapter according to claim 1, further comprising a noise filter connected to an input terminal of said speech recognizing means, for removing noise from said voice sound.

7. A speech recognition adapter according to claim 1, wherein the telephone set has a telephone answering function.

8. A speech recognition adapter for use with a multifunction telephone set which receives telephone signals from an exchange office, comprising:

data entry means for providing command information and for selectively providing telephone number signals comprising telephone numbers;

detection means for detecting voice sounds having voice sound patterns;

first memory means for storing voice sound pattern information; and, controller means including second memory means for controlling said detection means to repeatedly detect said voice sounds and to store said voice sound pattern information in said first memory means in response to said repeated detections of said voice sounds only when said voice sound pattern information of said repeated detections of said voice sound agree with each other, said controller means further storing said voice sound pattern information in association with a telephone number provided by said data entry means.

9. A speech recognition adapter for use in a telephone system having a telephone set and a central switching exchange according to claim 8 wherein said telephone set comprises a multifunctional telephone answering device.

10. A speech recognition adapter for use in a telephone system having a telephone set and a central switching exchange, according to claim 8 wherein said command information further comprises a telephone number.

11. A speech recognition adapter for use in a telephone system having a telephone set and a central switching exchange, according to claim 8 wherein said command information comprises telephone set function commands.

12. A speech recognition adapter for use in a telephone system having a telephone set and a central switching exchange, according to claim 8 wherein said detected voice sound patterns correspond to names of individual persons.

13. A speech recognition adapter for use in a telephone system having a telephone set and a central switching exchange, according to claim 8 wherein said voice sound patterns correspond to operational functions of said telephone set.

14. A speech recognition adapter for use in a telephone system having a telephone set and a central switching exchange, according to claim 8 wherein said data entry means further comprises a keypad of said telephone set.

15. A speech recognition adapter for use in a telephone system having a telephone set, said speech recognition adapter comprising:

name registration means, including a first memory, for receiving from said telephone set a voice sound including a name of a person to be called, and for storing said voice sound as a voice sound pattern in said first memory;

control means, including a second memory, for controlling said name registration means to store said voice sound pattern in said first memory in response to receiving repeated utterances of said voice sound when said voice sound patterns of said repeated utterances of said voice sound agree with each other; and, mean for entering a telephone number, wherein said control means stores in said second memory said telephone number in association with said stored voice sound pattern.

16. A speech recognition adapter for use in a telephone system having a telephone set, said speech recognition adapter comprising:

a name registration unit, including a first memory, for receiving from said telephone set a voice sound including a name of a person to be called, and for storing said voice sound as a voice sound pattern in said first memory;

a controller, including a second memory, for controlling said name registration unit to store said voice pattern in response to successive utterances of said voice sounds, when said voice sound patterns of said successive utterances of said voice sounds agree with each other; have the same voice sound patterns; and, a keypad for entering a telephone number, wherein said controller stores in said second memory said telephone number in association with said stored voice sound pattern.

* * * * *